United States Patent [19]
Garito et al.

[11] Patent Number: 5,845,025
[45] Date of Patent: Dec. 1, 1998

[54] OPTICAL COUPLING DEVICE AND PROCESS FOR MODULATING LIGHT

[75] Inventors: Anthony F. Garito, Radnor; Qiuming Qian, Drexel Hill; Yongming Cai, West Chester, all of Pa.

[73] Assignee: The Trustees of the University of Pennsylvania, Philadelphia, Pa.

[21] Appl. No.: 793,567

[22] PCT Filed: Aug. 29, 1994

[86] PCT No.: PCT/US94/09786

§ 371 Date: Apr. 30, 1997

§ 102(e) Date: Apr. 30, 1997

[87] PCT Pub. No.: WO96/06735

PCT Pub. Date: Mar. 7, 1996

Related U.S. Application Data

[63] Continuation-in-part of Ser. No. 3,103, Jan. 11, 1993, abandoned.

[51] Int. Cl.⁶ .............................. B32B 27/00; G02B 6/26
[52] U.S. Cl. ........................... 385/50; 252/582; 385/146; 428/473.5
[58] Field of Search ................................ 385/15, 39, 42, 385/50, 51, 146; 252/582, 587–589; 428/473.5

[56] References Cited

U.S. PATENT DOCUMENTS

| | | | |
|---|---|---|---|
| 4,026,632 | 5/1977 | Hill et al. | 385/50 X |
| 4,400,053 | 8/1983 | Kazkaz | 385/39 |
| 4,431,263 | 2/1984 | Garito | 385/143 |
| 4,439,514 | 3/1984 | Garito | 430/272.1 |
| 4,483,583 | 11/1984 | Unger | 385/42 |
| 4,536,450 | 8/1985 | Garito | 428/411.1 |
| 4,581,315 | 4/1986 | Garito | 430/269 |
| 4,615,962 | 10/1986 | Garito | 430/20 |
| 4,759,596 | 7/1988 | Po et al. | 385/37 |
| 4,950,044 | 8/1990 | Makita | 359/127 |
| 5,071,997 | 12/1991 | Harris | 528/353 |

FOREIGN PATENT DOCUMENTS 61-194407   8/1986   Japan .
1-287505   11/1989   Japan .

OTHER PUBLICATIONS

Garito, A.F., et al., "Origin of Nonlinear Optical Properties of Rigid Rod Polymers", MRS Int'l. Mtg. On Adv. Mats., 12, 1989, *Materials Research Society*, pp. 3–20.

Garito, A.F., et al., "Microscopic Origin of Second Order Nonlinear Optical Properties of Organic Structures" Edited by Paras N. Parsad and Donald R. Ulrich (Plenum Publishing Corp., 1988).

Garito, A.F. and Singer, K., "Organic Crystals and Polymers—A New Class of Nonlinear Optical Materials", Reprinted from Laser Focus Magazine, Feb., 1982, pp. 59–64.

Heflin, J.R. and Garito,A.F., "Optics Beyond the Limits", *Nature*, 356, Mar. 19, 1992.

Lindle, J.R., et al., "Nonlinear Optical Properties of Benzimidazobenzophenanthroline Type Ladder Polymers", Applied Physics Letters, 1990, 56(8), 712–714.

Sroog, C.E., "Polymides", *Prog. Polym. Sci.*, 1992, 16, 561–694.

Teng, C.C. and Garito, A.F., "Dispersion of the Nonlinear Second–Order Optical Susceptibility of an Organic System: p–Nitroaniline", *The American Physical Society*, 1983, 50, 350–352.

Ermer, et al., "Thermally Stable Electrooptic Polymers", *Polymer Preprints*, 1991, 32(3), 92–93.

Wu, et al., "Highly Thermally Stable Electrooptic Response in Poled Guest–Host Polyimide Systems Cured at 360° C.", *J. Applied Phys.*, Oct. 1991, 69, 7366–7368.

*Primary Examiner*—John D. Lee
*Attorney, Agent, or Firm*—Woodcock Washburn Kurtz Mackiewicz & Norris LLP

[57] ABSTRACT

Electro-optic devices and methods for making and using same are provided wherein waveguide elements are coupled by introducing between them a coupling element to permit strong optical coupling between the waveguides in a direction generally perpendicular to the direction in which light normally would propagate in the waveguides.

44 Claims, 9 Drawing Sheets

OPTICAL COUPLING DEVICE AND PROCESS FOR MODULATING LIGHT

RELATED APPLICATION

This patent application is a continuation-in-part of the U.S. patent application Ser. No. 08/003,103, filed Jan. 11, 1993, now abandoned, the entire contents of which is incorporated herein by reference.

FIELD OF THE INVENTION

This invention relates to novel optical devices and, more particularly, to high speed, high bandwidth integrated polymer electro-optic modulators.

BACKGROUND OF THE INVENTION

Electro-optic (EO) modulators have been identified as likely alternatives to diode direct modulators for the next generation of single-mode transmission systems (see, e.g., Korotoky, et al., *J. Lightwave Technol.*, 1985, LT-3, 1027.) Among external modulators, poled polymer EO modulators have demonstrated particular potential for such applications. (see, e.g., Teng, *Appl. Phys. Lett.* 1992, 60(13), 1538.) Poled polymer modulators provide many attractive characteristics and advantages, including large optical nonresonant EO coefficients, low dielectric constants, ultrafast electronic responses, multiple layer device ability, and simple fabrication techniques which are compatible with standard semiconductor device manufacturing steps. By comparison with Ti:LiNbO$_3$ EO modulators and semiconductor EO modulators, poled polymer EO modulators are easier to fabricate.

Important properties for evaluating EO modulators include coupling strength, bandwidth, insertion loss, voltage-length-product, and driving power. Although a number of EO modulators have been reported, such devices have not yet met industry performance criteria. Indeed, most known EO modulators exhibit only weak coupling, narrow bandwidth, high insertion loss, high voltage-length product, and/or high driving power. Thus, there remains a need in the art for improved devices that meet industry standards.

OBJECTS OF THE INVENTION

It is one object of the present invention to provide optical (e.g., electro-optical) devices.

It is another object of the invention to provide EO modulators, particularly those that exhibit tunable strong coupling.

It is yet another object to provide poled polymer EO devices.

It is yet another object to provide methods for designing and fabricating optical devices.

It is still another object to provide methods for operating the optical devices of the present invention.

SUMMARY OF THE INVENTION

These and other objects are satisfied by the present invention, which provides a new class of optical devices wherein optical waveguide elements are coupled by introducing an optical coupling element between them to permit strong optical coupling between the waveguides in a direction generally perpendicular to the direction in which light would propagate in the waveguide in the absence of the coupling element.

The optical devices of the invention generally include first and second waveguide members that each have a longitudinal surface extending between a light input surface and a light output surface. Disposed between the first and second members and optically coupled to each is an optical coupling member that can be used to tune the coupling strength between the first member and second member. Surrounding the members is some form of cladding. In preferred embodiments, the longitudinal surface of the first member includes a first coupling surface, the longitudinal surface of the second member includes a second coupling surface, and the coupling member includes surfaces that are coupled, respectively, with the first coupling surface and the second coupling surface.

The first member, second member, and coupling member can be fabricated from a variety of materials and in a variety of dimensions and shapes. The first member and the second member preferably have similar shape and dimensions and the coupling member preferably has shape and dimensions that are different from the first and second members, and a refractive index that is larger than the refractive index of the first and second members or the cladding. In preferred embodiments, devices of the invention further include means for applying light to one or both input surfaces, electrode means for establishing a modulating electric field within the device, and output means for receiving light discharged from one or more of the output surfaces.

In contrast to traditional directional couplers, the devices of the invention enhance the coupling strength between the first and second members through use of a coupling member that has an index of refraction that is different from (and preferably larger than) the index of refraction of the cladding. Changing the dimensions of the coupling member provides a simple yet precise means for tuning the coupling strength of the devices. The resulting device architectures permit significantly increased integration density, wider band electro-optic signal modulation, and broad application in a variety of device designs including modulators, switches, couplers, routers, and rail taps while complying with standard device fabrication conditions.

BRIEF DESCRIPTION OF THE DRAWINGS

The numerous objects and advantages of the present invention may be better understood by those skilled in the art by reference to the accompanying non-scale figures, in which.

DETAILED DESCRIPTION OF THE INVENTION

FIGS. 1–10 show exemplary optical devices according to the invention (i.e., 10, 20, 30, 40, and 50). Each device comprises: (1) a first waveguide member (e.g., 12 and 52) having a first input surface (e.g., 12a and 52a) and a first output surface (e.g., 12b and 52b); (2) a second waveguide member (e.g., 14 and 54) having a second input surface (e.g., 14a and 54a) and a second output surface (e.g., 14b and 54b); and (3) a coupling member (e.g., 16 and 56). The first member and the second member each further include a longitudinal surface (e.g., 12c, 14c) extending between the input surface and the output surface. The shapes of these members can be the same or different, so long as the selected shapes permit optical coupling with each other and with any selected light input and output devices. Preferred shapes are those which present lateral cross-sections of relatively constant size and shape along the member's length. The shape of such lateral cross-sections can be any closed-plane shape such as, for example, an ellipse (i.e., a circle or oval; see, e.g., FIGS. 3 and 4), a tetrahedron (see, e.g., FIGS. 1 and 2), or a more complex polyhedron (see, e.g., FIGS. 5 and 6). The shape of longitudinal member cross-sections likewise can be any closed-plane shape, although tetrahedral cross-sections are preferred. The ends of the members can be concave, convex, square, or slanted.

Figure 1:
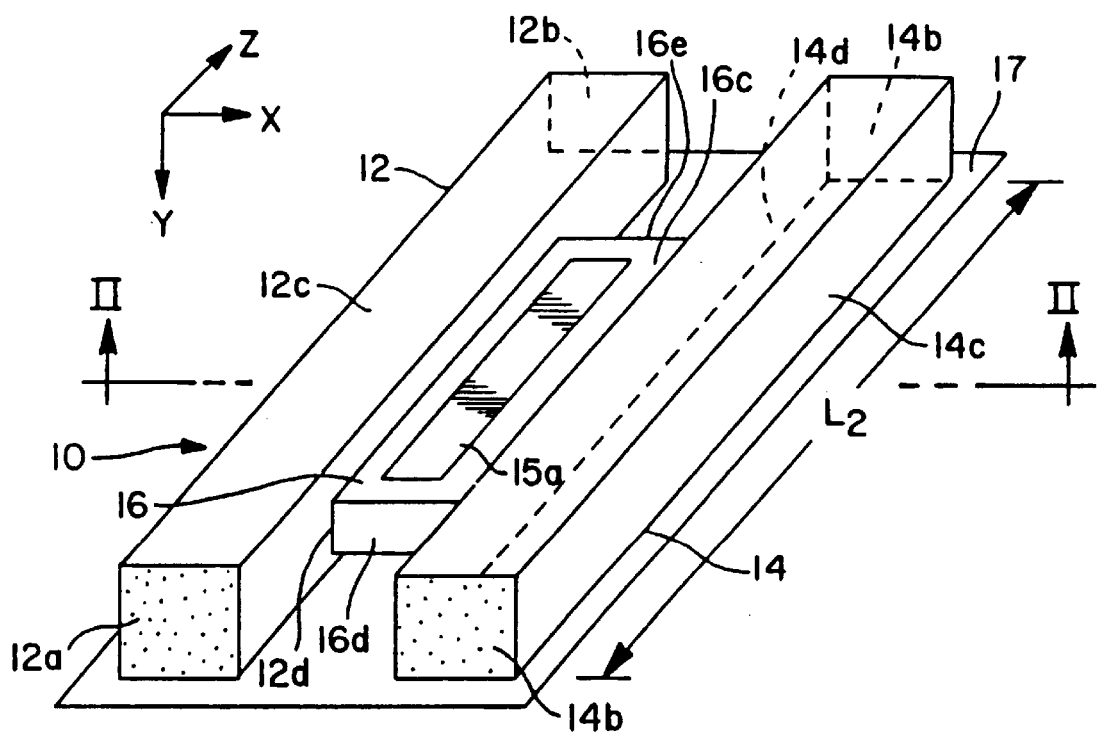
FIG. 1 is a perspective view of an optical device of the invention having generally rectilinear shape.
Figure 2:
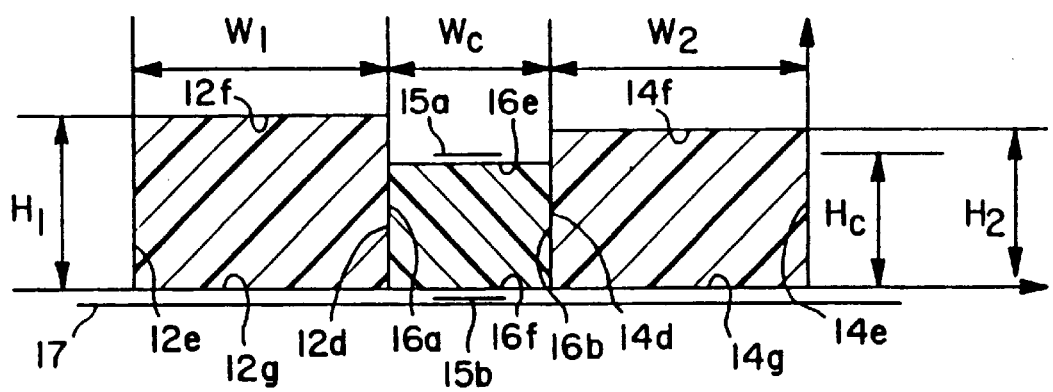
FIG. 2 is a cross-sectional view of an optical device of the invention, as indicated by line II—II in FIG. 1.
Figure 3:
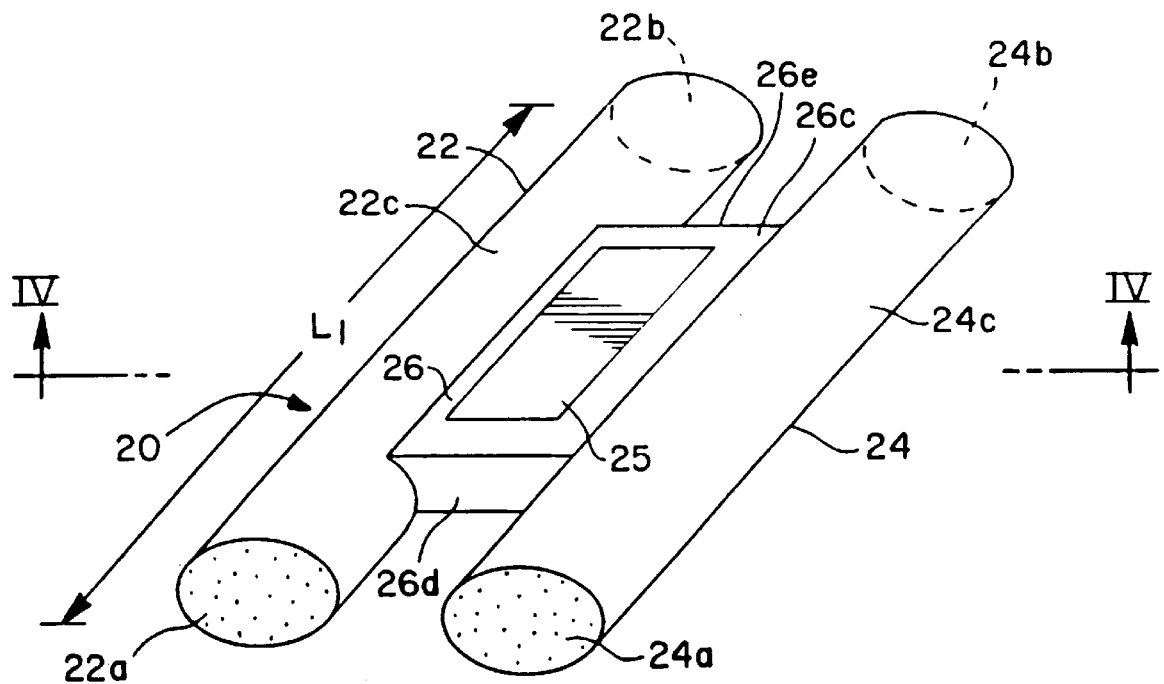
FIG. 3 is a perspective view of an optical device of the invention having generally cylindrical shape.
Figure 4:
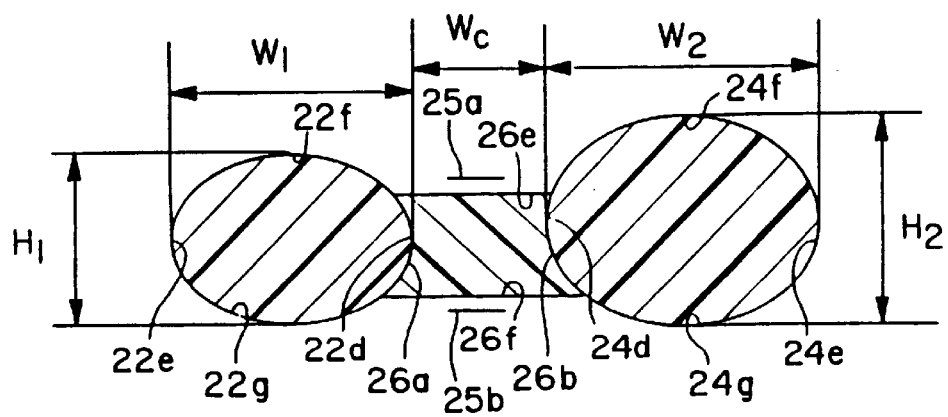
FIG. 4 is a cross-sectional view of an optical device of the invention, as indicated by line IV–IV in FIG. 3.
Figure 5:
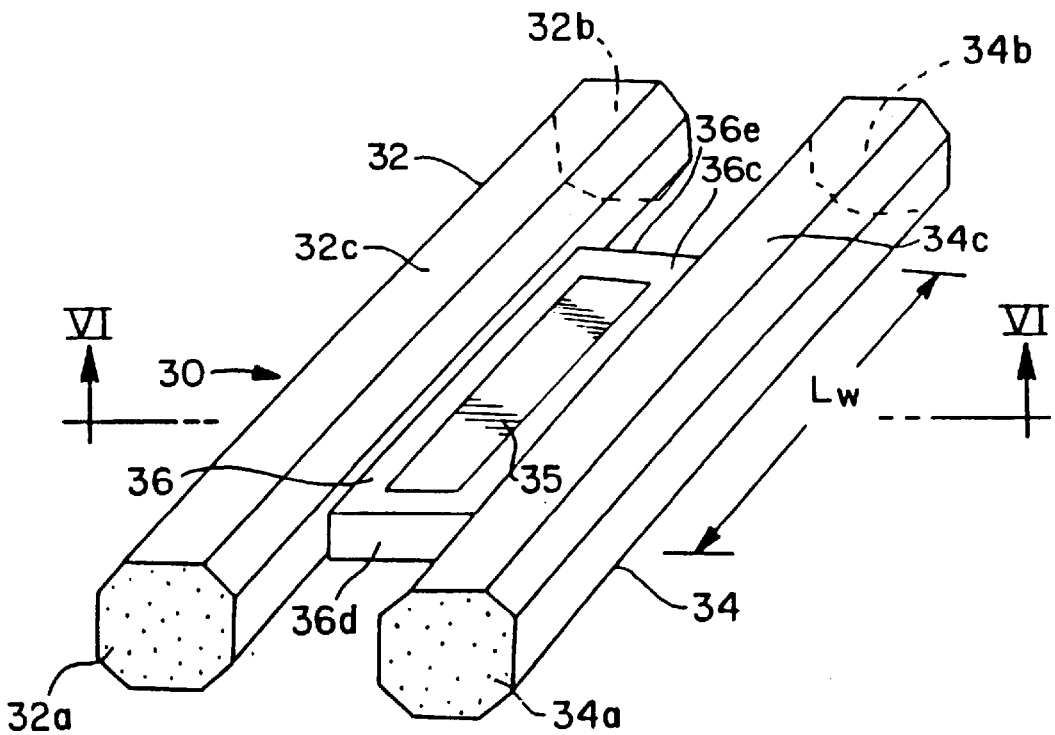
FIG. 5 is a perspective view of a polyhedral optical device of the invention.
Figure 6:
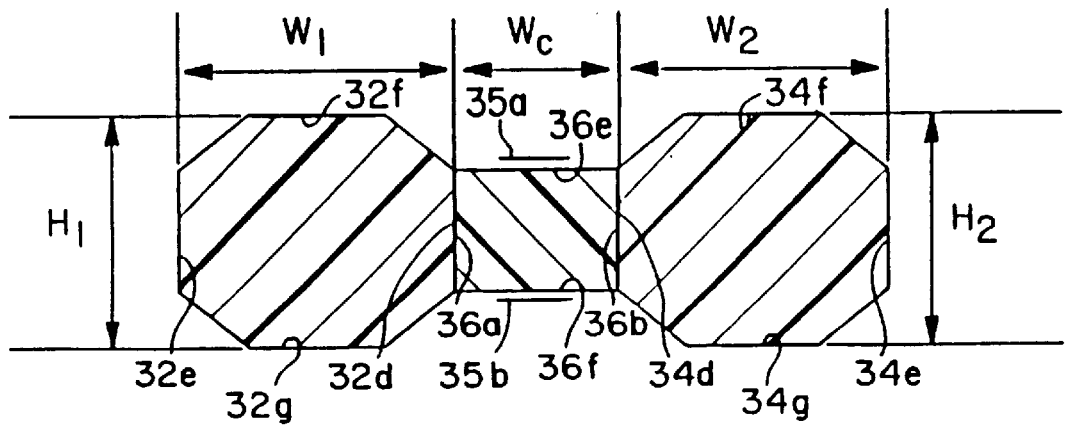
FIG. 6 is a cross-sectional view of an optical device of the invention, as indicated by line VI—VI in FIG. 5.
Figure 7:
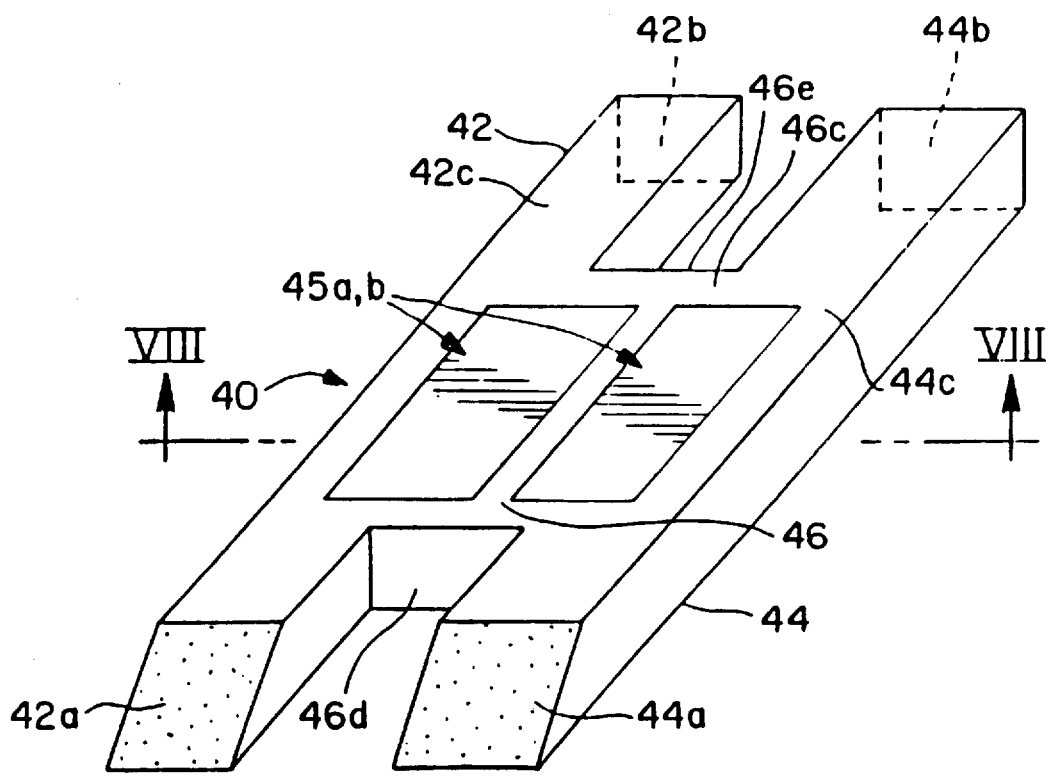
FIG. 7 is a perspective view of a monolithic optical device of the invention.
Figure 8:
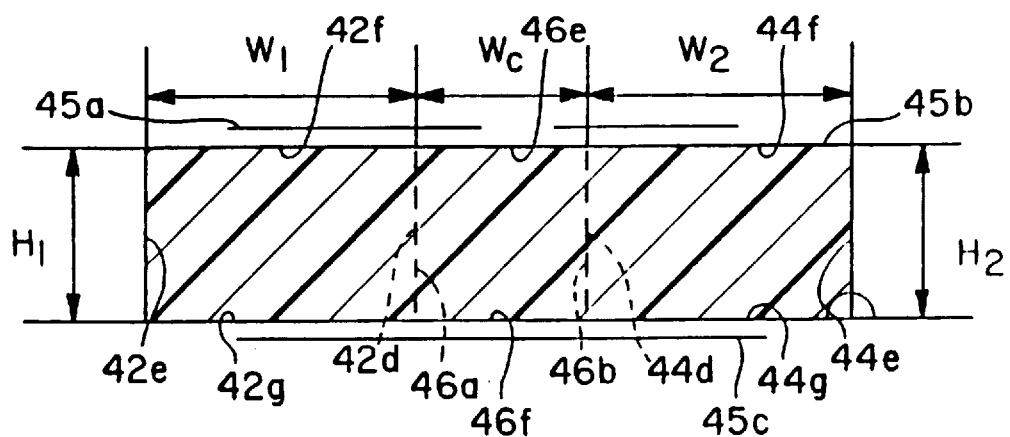
FIG. 8 is a cross-sectional view of an optical device of the invention, as indicated by line VIII—VIII in FIG. 7.
Figure 9:
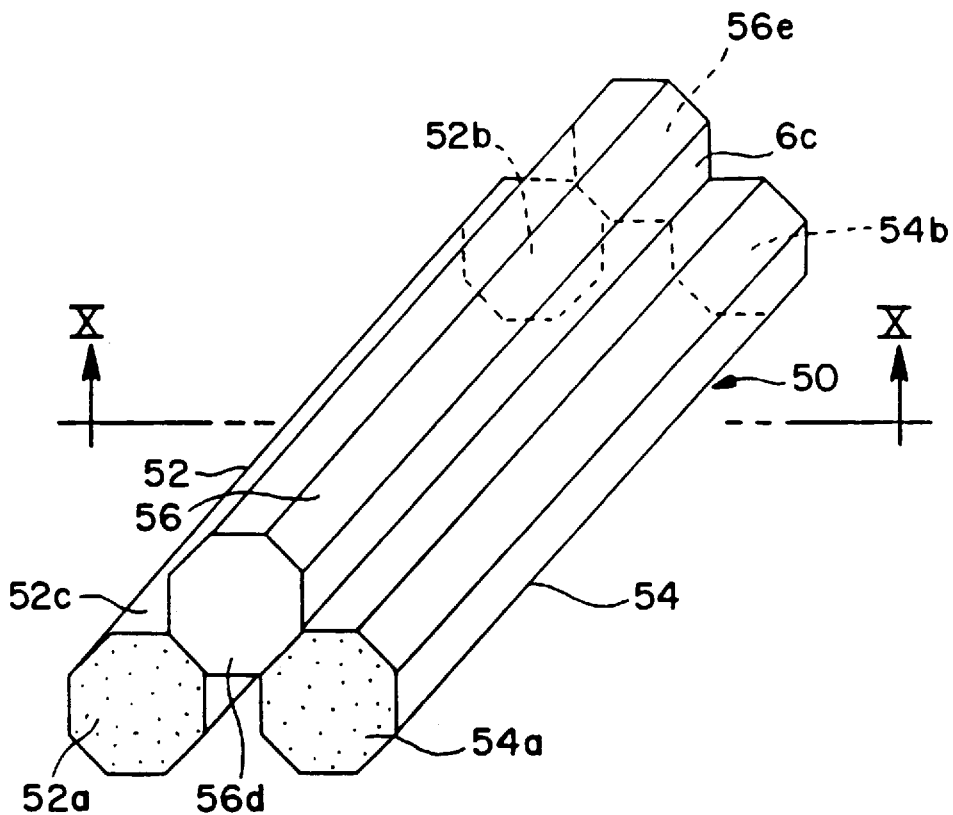
FIG. 9 is a perspective view of a polyhedral optical device of the invention.
Figure 10:
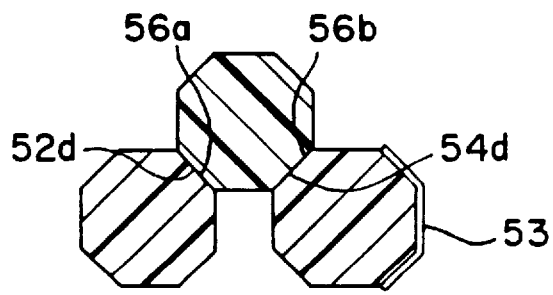
FIG. 10 is a cross-sectional view of an optical device of the invention, as indicated by line X—X in FIG. 9.

As exemplified in FIG. 1, longitudinal surface 12c of first waveguide member 12 includes a surface 12d that is optically coupled with a surface 16a of coupling member 16, and longitudinal surface 14c of second waveguide member 14 includes a surface 14d that is optically coupled with a further surface 16b of coupling member 16. The remainder of the longitudinal surface 16c of the coupling member extends between coupling surfaces 16a and 16b. Devices according to the invention preferably are disposed on a substrate 17 or some other structural support or cladding.

The shape and dimensions of the first member, second member, and coupling member can be the same or different. The length of the first member ($L_1$) preferably is from 1 to about 20 millimeters, more preferably from 5 to about 15 millimeters, even more preferably about 10 millimeters. For single-mode input and output devices, the width of the first member ($W_1$) preferably is from 1 to about 10 microns, more preferably from about 2 to about 5 microns, more preferably from about 3 to about 4 microns, depending on the wavelength of light used. For multiple-mode input and output devices, the width of the first member preferably is from 5 to about 100 microns, more preferably from about 10 to about 70 microns, more preferably from about 10 to about 40 microns, depending upon the number of modes input and output. The height of the first member ($H_1$) preferably is from 0.5 to about 10 microns, more preferably from about 1 to about 5 microns, more preferably from about 2 to about 3 microns.

The length of the second member ($L_2$) preferably is from 1 to about 20 millimeters, more preferably from 5 to about 15 millimeters, even more preferably about 10 millimeters. For single-mode input and output devices, the width of the second member ($W_2$) preferably is from 1 to about 10 microns, more preferably from about 2 to about 5 microns, more preferably from about 3 to about 4 microns, depending on the wavelength of light used. For multiple-mode input and output devices, the width of the second member preferably is from 5 to about 100 microns, more preferably from about 10 to about 70 microns, more preferably from about 10 to about 40 microns, depending upon the number of modes input and output. The height of the second member ($H_2$) preferably is from 0.5 to about 10 microns, more preferably from about 1 to about 5 microns, more preferably from about 2 to about 3 microns.

The length of the coupling member ($L_c$) preferably is up to about 10 millimeters, more preferably from 0.1 to about 5 millimeters, even more preferably about 0.5 to about 1.5 millimeters. The width of the coupling member ($W_c$) preferably is less from 0.1 microns to about 20 microns, more preferably from about 1 micron to about 15 microns, more preferably from about 2 microns to about 10 microns. The height of the coupling member ($H_c$) preferably is from 0.1 to about 10 microns, more preferably from about 1 to about 5 microns, more preferably from about 2 to about 3 microns. In general, the height of the coupling member should be less than or equal to the height of the first member and less than or equal to the height or the second member.

It will be recognized that the lengths, widths, and heights of waveguide members and coupling members according to the invention are defined by opposing surfaces of the members. In general, the length of a member is the greatest distance between opposing surfaces measured along the z-axis, the width of a member is the greatest distance between opposing surfaces measured along the x-axis, and the height of a member is the greatest distance between opposing surfaces measured along the y-axis. For example, the length of first member 12 is defined by input surface 12a and output surface 12b, its width is defined by coupling surface 12d and opposing surface 12e, and its height is defined by opposing surfaces 12f and 12g. However, in embodiments wherein at least one of the surfaces is concave (e.g., surface 26a) the length of a member is the least distance between opposing surfaces measured along the z-axis, the width of a member is the least distance between opposing surfaces (e.g., 26a and 26b) measured along the x-axis, and the height of a member is the least distance between opposing surfaces measured along the y-axis.

In preferred embodiments, the length, width, and height of the first member are substantially the same as the length, width, and height of the second member, and the length, width, and height of the coupling member are less than the length of the first member or the second member. In general, the greater length of the first member and the second member (relative to the coupling member) is to permit coupling with light input and output devices.

Figure 11:
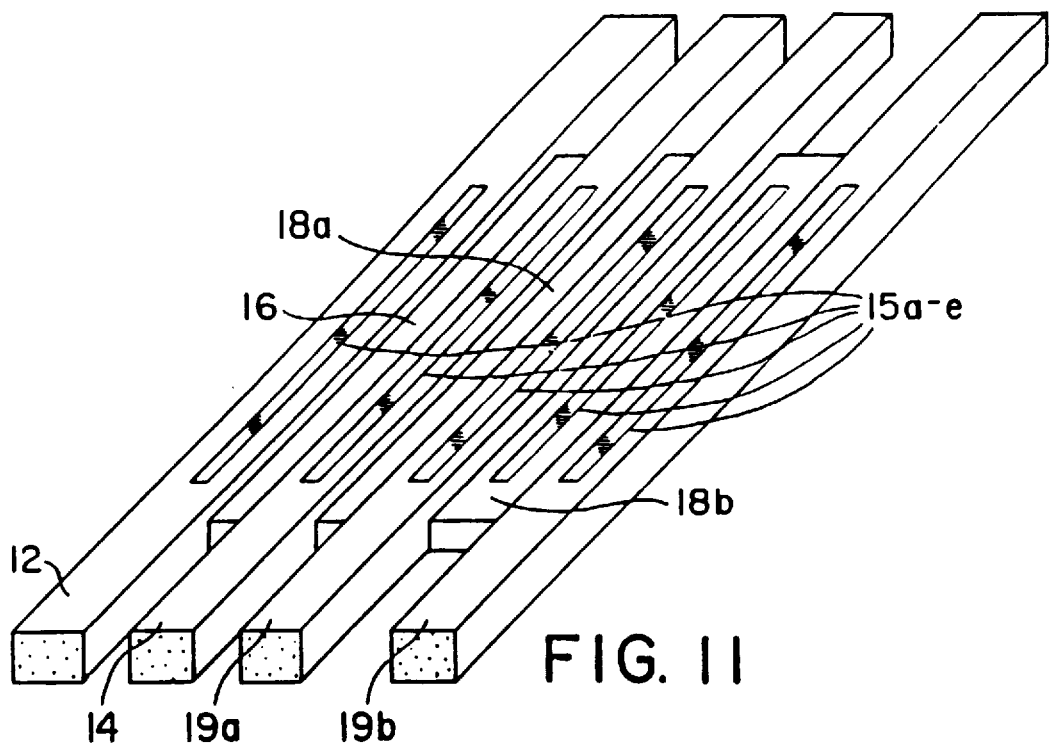
FIG. 11 is a perspective view of a rectilinear optical device of the invention containing a plurality of waveguide members and coupling members.
Figure 12:
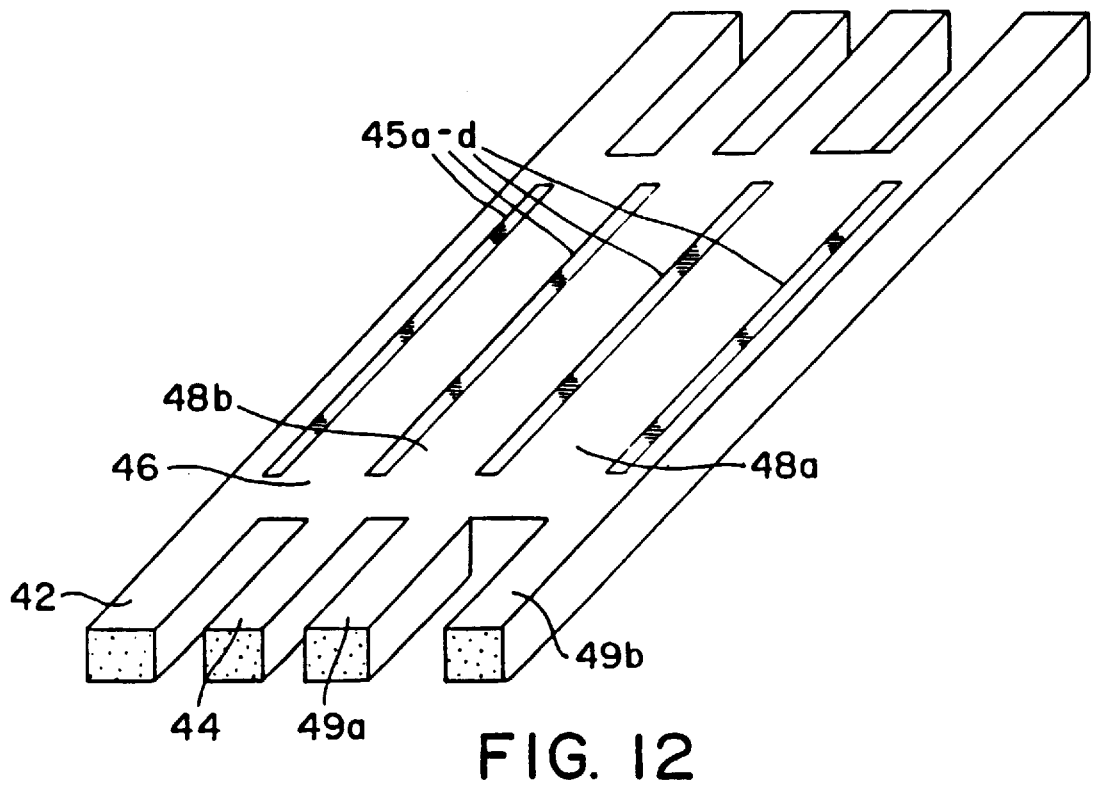
FIG. 12 is a perspective view of a monolithic, rectilinear optical device of the invention containing a plurality of waveguide members and coupling members.
Figure 13:
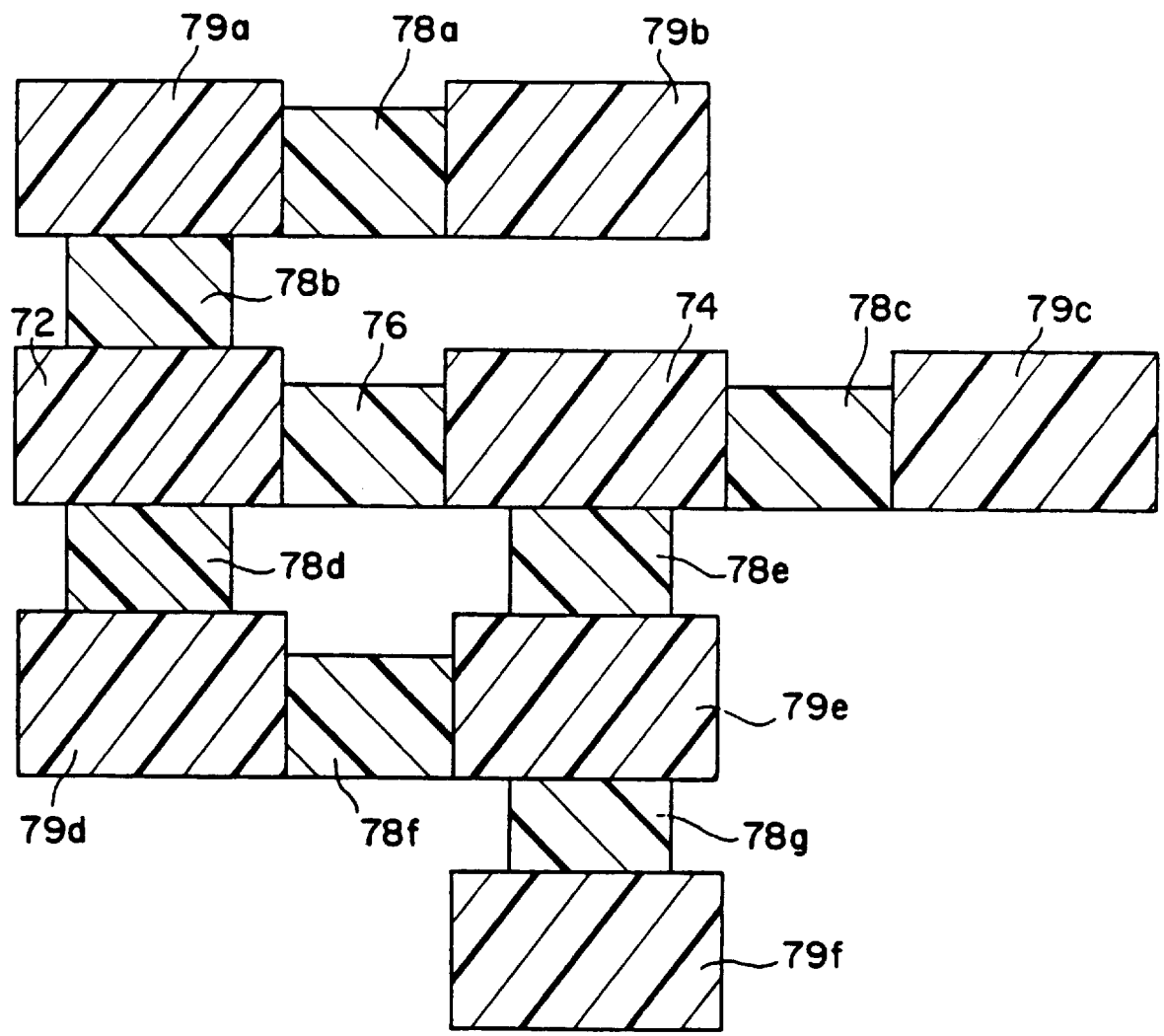
FIG. 13 is a cross-sectional view of an optical device of the invention containing a three-dimensional array of waveguide members and coupling members.

For certain applications, devices according to the invention include more than just two waveguide members and a single, intermediate coupling member. Indeed, elaborate two- and three-dimensional arrays of optically coupled waveguides can be constructed by appending to the first or second waveguide one or more peripheral assemblies that individually comprise a coupling member and a waveguide member of the type discussed above. For example, FIGS. 11–13 show representative arrays containing a plurality of additional coupling members (e.g., 18, 48, and 78) and waveguide members (e.g., 19, 49, and 79).

Although the first member, second member, and coupling member can exist as separate structures that are bonded or otherwise placed in contact with one another, these members also can form defined regions within one or more monolithic structures. Thus, a device according to the invention can be formed by joining separate elements (see, e.g., FIGS. 1 and 2), by stamping, pressing, carving, molding, or otherwise forming from a single mass of material a structure that includes one or more members (see, e.g., FIGS. 7 and 8), or by some combination thereof. For example, the first member and coupling member can be carved from a single mass and then placed in optical communication with the second member.

The devices of the invention can be fabricated by a wide variety of techniques known in the art. Representative fabrication techniques are disclosed by Holland, "Fabrication and Characterization of Polymeric Lightwave Devices," pp. 397–431 in Polymers for Lightwave and Integrated Optics, L.A. Hornack, ed., 1992, New York, Marcel Dekker. Devices of the invention preferably are constructed by shaping the first member, second member, and third member from the same optical material or from different optical materials and then coupling such members in a desired configurations. Typically, such techniques combine aspects of spin coating and lithography. For example, a first step for preparing the device shown in FIG. 1 could involve coating the ground electrode, forming the substrate layer by spin coating and baking, and then forming the guiding layer by spin coating. The channel waveguide pattern will be formed by lithographic methods and the resulting device baked. A cladding layer will be spin coated onto the guiding layer, and electrodes will be formed thereupon using lithographic techniques.

Optical materials are those through which light with wavelength between about 4 nanometers and about 1 millimeter will pass, including those materials that alter the intensity, frequency, wavelength or another property of the light. Representative optical materials include organic polymers and semiconductors such as gallium arsenide, and ferroelectric materials such as lithium niobate. (See, e.g., Goossen, et al., IEEE MTT-S Digest, 1991, 1053; Ogawa, et al., IEEE MTT-S Digest, 1991, 1067; Hiraoka, et al., IEEE Trans. Microwave Theory Tech. 1989, MTT-10, 1569; and Nakamoto, et al., The Third Asia-Pacific Microwave Conference, 1990, 1113). Preferred optical materials are those that exhibit a nonlinear optical response. As will be recognized, nonlinear optical responses can be classified as resonant or non-resonant, depending upon how close the optical frequencies employed are to the natural absorption frequencies of the material. Materials that exhibit second-order nonlinear optical response are particularly preferred. Second-order processes (i.e., those in which the response is proportional to the square of applied electric fields) include second-harmonic generation, in which a material generates light at twice the frequency of the incident light, and the electrooptic effect, wherein an applied electric field changes the refractive index of the material and, therefore, alters the propagation properties of the incident light. Particularly preferred materials are synthetic organic polymers that include polycyclic aromatic compounds, such as those disclosed in abandoned U.S. patent application Ser. No. 08/003, 103, filed Jan. 11, 1993, and incorporated herein by reference. In certain embodiments, the polycyclic aromatic compounds have formulas (1), (2), (3), or (4):

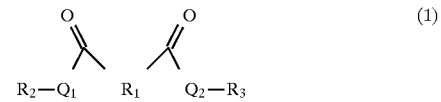

(1)

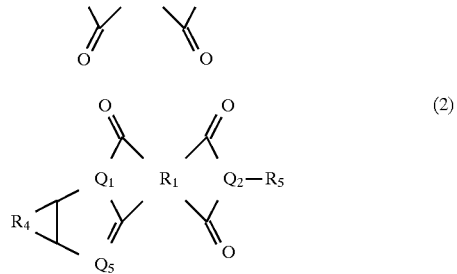

(2)

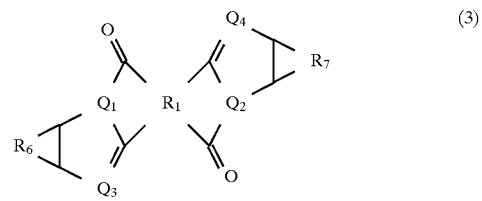

(3)

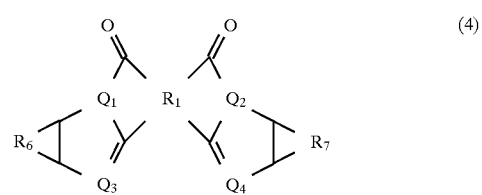

(4)

wherein:

$R_1$ is a tetravalent aromatic radical;

$Q_1$, $Q_2$, $Q_3$, and $Q_4$ are, independently, heteroatoms that participate in delocalized $\pi$-electron systems; and $R_2$–$R_7$ are, independently, alkyl groups or aromatic groups.

In preferred embodiments, $R_2$ and $R_6$ are, independently, alkyl groups or aromatic groups that are electron-donating relative to hydrogen, and $R_3$ and $R_7$ are, independently, alkyl groups or aromatic groups that are electron-withdrawing relative to hydrogen. Preferably, one of $R_4$ and $R_5$ is an alkyl group or an aromatic group that is electron-donating relative to hydrogen, and the other is an alkyl group or an aromatic group that is electron-withdrawing relative to hydrogen.

In further preferred embodiments, the polycyclic aromatic compounds have formulas (5), (6), (7), or (8):

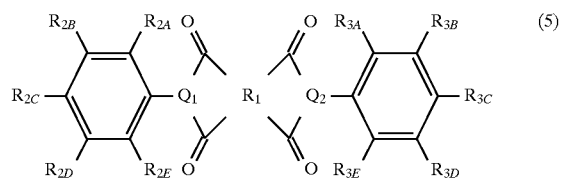

(5)

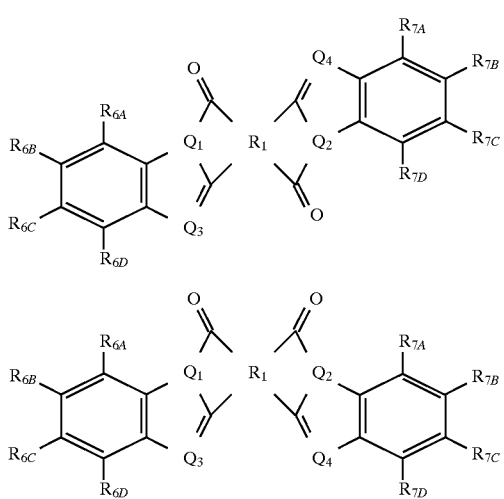

wherein:

R₁ is a tetravalent aromatic radical;

Q₁, Q₂, Q₃, and Q₄ are, independently, heteroatoms that participate in delocalized π-electron systems;

at least one of $R_{2A}$–$R_{2E}$ is an aromatic or non-aromatic group that is electron-donating relative to hydrogen;

at least one of $R_{3A}$–$R_{3E}$ is an aromatic or non-aromatic group that is electron-withdrawing relative to hydrogen;

at least one of $R_{4A}$–$R_{4D}$ is an aromatic or non-aromatic group that is electron-donating relative to hydrogen and R₅ is an alkyl or aromatic group that is electron-withdrawing relative to hydrogen, or at least one of $R_{4A}$–$R_{4D}$ is an aromatic or non-aromatic group that is electron-withdrawing relative to hydrogen and R₅ is an alkyl or aromatic group that is electron-donating relative to hydrogen;

at least one of $R_{6a}$–$R_{6D}$ is an aromatic or non-aromatic group that is electron-donating relative to hydrogen; and at least one of $R_{7A}$–$R_{7D}$ is an aromatic or non-aromatic group that is electron-withdrawing relative to hydrogen.

Compounds of this type have been found to exhibit second order nonlinear optical properties and decomposition temperatures greater than about 360° C. In preferred embodiments, R₁ is a tetravalent aromatic radical. Preferably, R₁ is derived from an aromatic hydrocarbon such as, for example, benzene, perylene, phenanthrene, anthracene, naphthalene, pyrene, chrysene, or naphthacene; aromatic groups derived from benzene, perylene, and naphthalene are particularly preferred. In accordance with the invention, Q₁–Q₄ are independently selected heteroatoms that can participate in a delocalized π-electron system spanning essentially the entire length of the compounds represented by formulas (1)–(4). Numerous suitable heteroatoms are known to those skilled in the art, including N, O S, Se, and Te. Preferably, each of Q₁–Q₄ is N.

In embodiments represented by formulas (1)–(4), R₂, R₆, and one of R₄ and R₅ are alkyl groups or aromatic groups that possess net electron-donating effects, including straight chain and branched chain aliphatic hydrocarbons, straight chain and branched chain aliphatic hydrocarbons substituted with at least one substituent that is electron-donating relative to hydrogen, aromatic hydrocarbons, aromatic heterocycles, aromatic hydrocarbons substituted with at least one substituent that is electron-donating relative to hydrogen, or aromatic heterocycles substituted with at least one substituent that is electron-donating relative to hydrogen. Conversely, R₃, R₇, and one of R₄ and R₅ are alkyl groups or aromatic groups that possess net electron-withdrawing effects, including straight chain and branched chain aliphatic hydrocarbons substituted with at least one substituent that is electron-withdrawing relative to hydrogen, aromatic heterocycles, aromatic hydrocarbons substituted with at least one substituent that is electron-withdrawing relative to hydrogen, or aromatic heterocycles substituted with at least one substituent that is electron-withdrawing relative to hydrogen.

In embodiments represented by formulas (5)–(8), $R_{2A}$–$R_{2E}$, and $R_{6A}$–$R_{6D}$ can be substituents that possess net electron-donating effects. Conversely, $R_{3A}$–$R_{3E}$ and $R_{7A}$–$R_{7D}$ are substituents that possess net electron-withdrawing effects.

Numerous examples of electron-donating and electron-withdrawing aromatic functionality are well-known to those skilled in the art. Further, electron-donating and electron-withdrawing groups can be identified through routine experimentation (e.g., substitution for hydrogen in a molecule and testing of any resultant inductive effects). In preferred embodiments, electron-donating groups are aromatic hydrocarbons substituted with alkyl groups, alkylamino groups, NH₂, alkoxyl groups, OH, alkylthio groups, SH, and/or —OC(O)-(alkyl), wherein alkyl groups have from about 1–10 carbon atoms.

Electron-withdrawing groups preferably are aromatic hydrocarbons substituted with one or more groups selected from N-(alkyl)₃⁺, S-(alkyl)₂⁺, NH₃⁺, NO₂, SO₂-(alkyl), CN, SO₂-(aromatic), C(O)OH, F, Cl, Br, I, C(O)O-(alkyl), C(O)-(alkyl), and/or CHO, wherein alkyl groups have from about 1–10 carbon atoms and aromatic groups have about 6–24 carbon atoms.

It has been found in accordance with the invention that polycyclic aromatic compounds exhibiting sensible, second order nonlinear optical effects can be identified (screened) on the basis of their UV/visible spectra. In general, useful compounds exhibit at least one UV/visible transition, or, equivalently, excitation, having an extinction coefficient greater than about $1 \times 10^5$ l mole⁻¹ cm⁻¹ as determined by standard techniques. Such an electronic excitation should principally be responsible for a second order nonlinear optical effect, especially under non-resonant conditions.

Preferred polycyclic aromatic compounds according to the present invention have formulas (9)–(20).

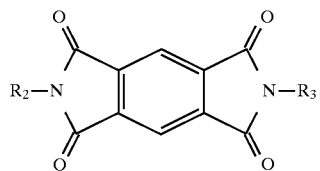
(9)
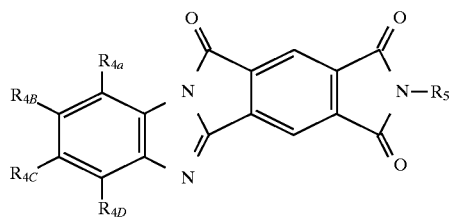
(10)
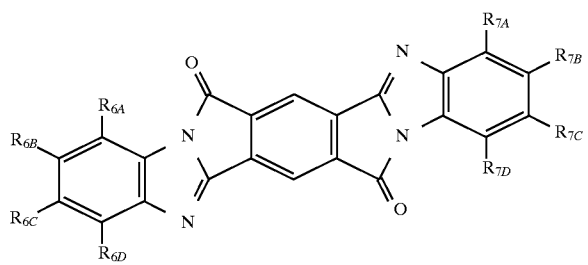
(11)
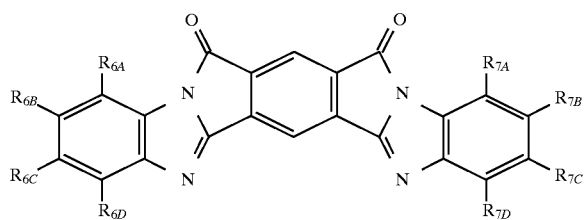
(12)
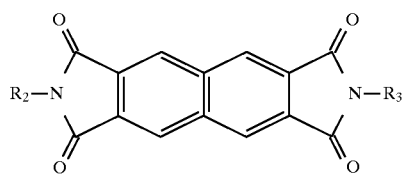
(13)
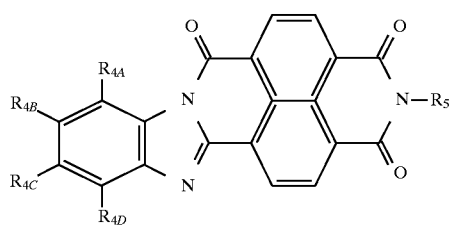
(14)
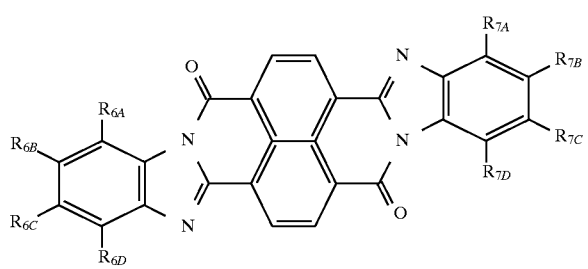
(15)

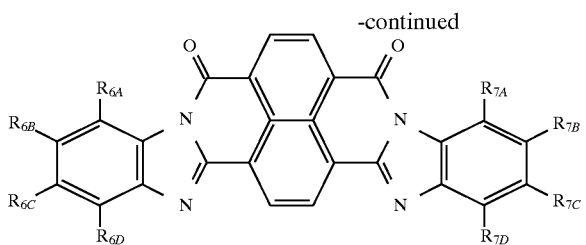
(16)

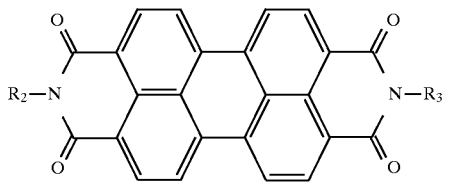
(17)

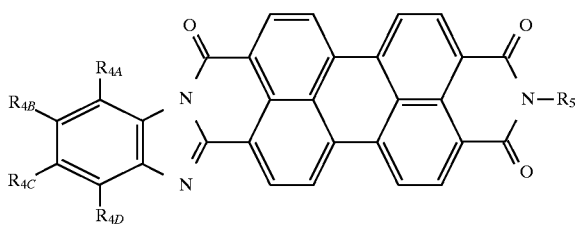
(18)

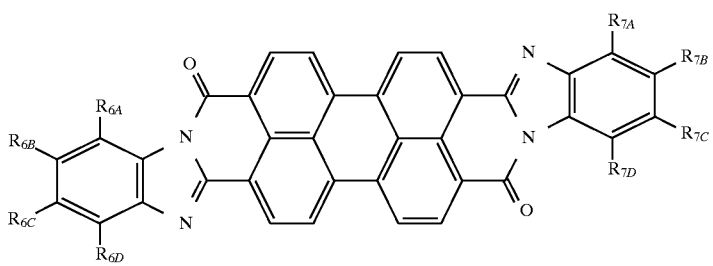
(19)

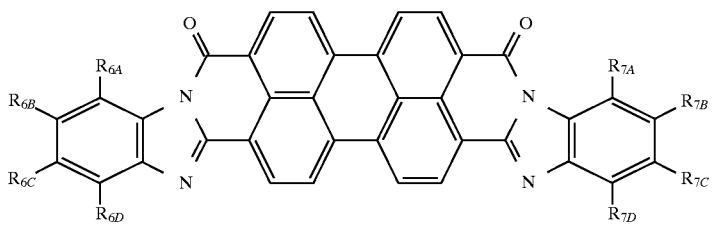
(20)

Such polycyclic aromatic compounds can be used in pure or substantially pure form as, for example, crystals, crystalline films, oligomers or polymers. Those skilled in the art will appreciate that a wide variety of polymeric and oligomeric structures can be constructed in accordance with the present invention using compounds having formulas (1), (2), (3), and/or (4) as monomeric building blocks. For example, formulas (21) and (22) show representative structures wherein $R_8$ is alkyl or aromatic, $R_9$ is O or NH, $Q_5$ is a heteroatom that can participate in a delocalized π-electron system, and n is from 2 to about 2000.

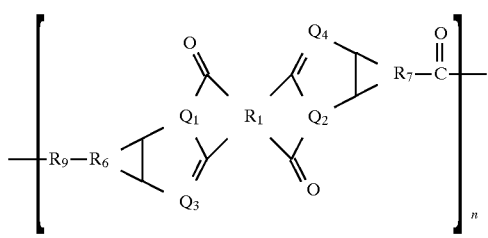
(21)

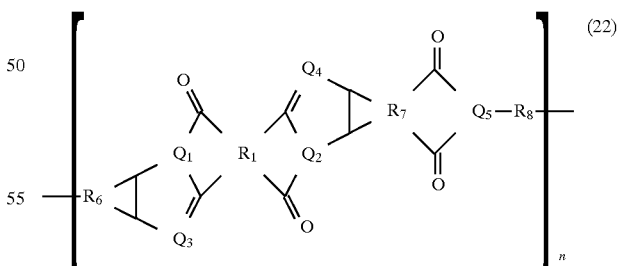
(22)

Alteratively, the polycyclic aromatic compounds can be combined with one or more synthetic organic polymers or precursors thereof (e.g., monomers, catalysts, and sensitizers). Such embodiments offer the possibility of effecting cross-linking and/or in situ polymerization following mixture of the polymer or polymer precursor system with a compound of the invention. Where the polymer constitutes a major proportion of the layer and the polycyclic compound constitutes a minor proportion of the layer, the compound can be said to be a "guest" in the "host" polymer.

Polycyclic aromatic compounds also can be covalently bound as side chains on a polymeric backbone or core. Exemplary backbone/side chain structures are provided by formulas (23) and (24), wherein: $R_8$ is alkyl or aromatic; $R_9$ is O or NH; $R_{10}$ is a tetravalent aromatic radical; $R_{11}$ and $R_{12}$ are, independently, alkyl or aromatic; $Q_5$ is a heteroatom that can participate in a delocalized π-electron system; and n is from 2 to about 2000. Those skilled in the art will recognize that a wide variety of other structures are possible.

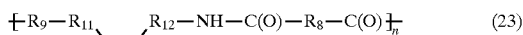

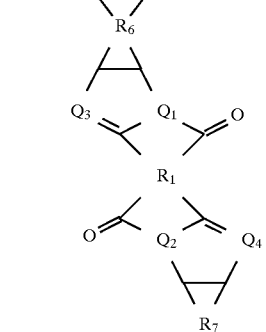

(23)

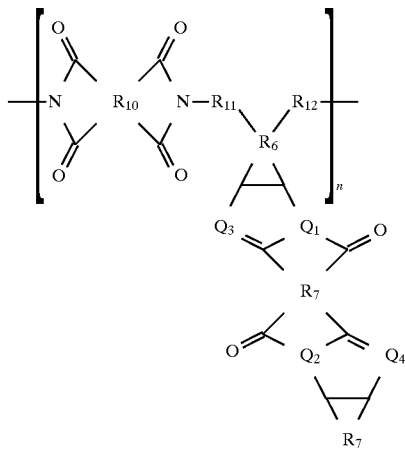

(24)

It is believed that the polycyclic aromatic compounds of the invention can be mixed with virtually any synthetic organic polymer or polymer precursor system known in the art. It is also believed that the such compounds can be covalently bound with an equally wide variety of polymers, possibly through use of linking moieties such as alkyl, alkoxyl, and or alkylamino groups. Representative synthetic organic polymers include polyimides, polyacrylates, polymethacrylates, polyesters, polycarbonates, polystyrenes, polyolefins, and polyvinyl ethers. Polyimides, particularly those disclosed in Harris, et al., *Polym. Prepr.,* 1990, 31, 342 are preferred polymers.

In general, the refractive indices of the first and second waveguide members and the coupling member are individually selected to be the same or different. In electro-optic devices the refractive indices can be altered somewhat by, for example, the application of voltage to the member. It generally is preferred that the refractive index of the coupling member be greater than the refractive index of the waveguide members.

The devices of the invention generally bear some sort of cladding (e.g., 53) on at least some portion of their outer surface. In preferred embodiments, the entire device surface is surrounded by cladding. The cladding can be any substance whose index of refraction is lower than the indices of refraction of the waveguide members and the coupling members. Representative cladding materials include air, glass, and organic polymers.

Figure 14:
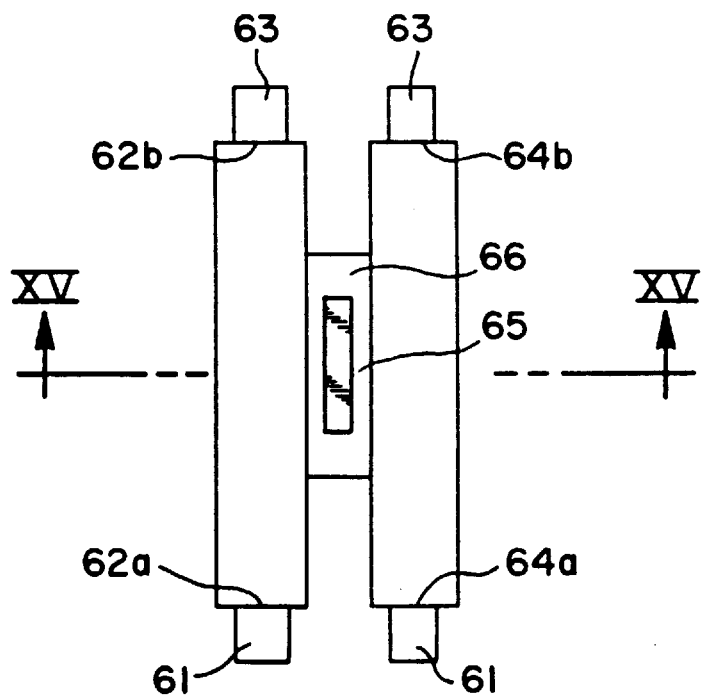
FIG. 14 is a plan view of an optical device of the invention coupled with input means and output means.

During use, the devices of the invention typically are coupled with suitable light input and light output devices. Referring to FIG. 14, input devices 61 are optically coupled with one or more waveguide input surfaces 62a, 64a and supply light in the infrared and/or ultraviolet wavelength region (i.e., about 1–1000 μm and about 4–400 nm, respectively) to the input surfaces. Output devices 63 are optically coupled with one or more waveguide output surfaces 62b, 64b and receive light discharged therefrom. Coupling of such the input and output devices can be accomplished using any of the fiber-to-waveguide coupling techniques known in the art, including butt coupling, direct end coupling, and pigtailing.

Figure 15:
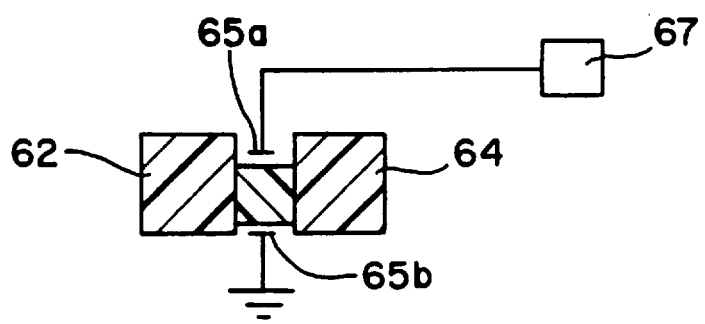
FIG. 15 is a cross-sectional view of an optical device of the invention coupled to an external voltage source.
Figure 16:
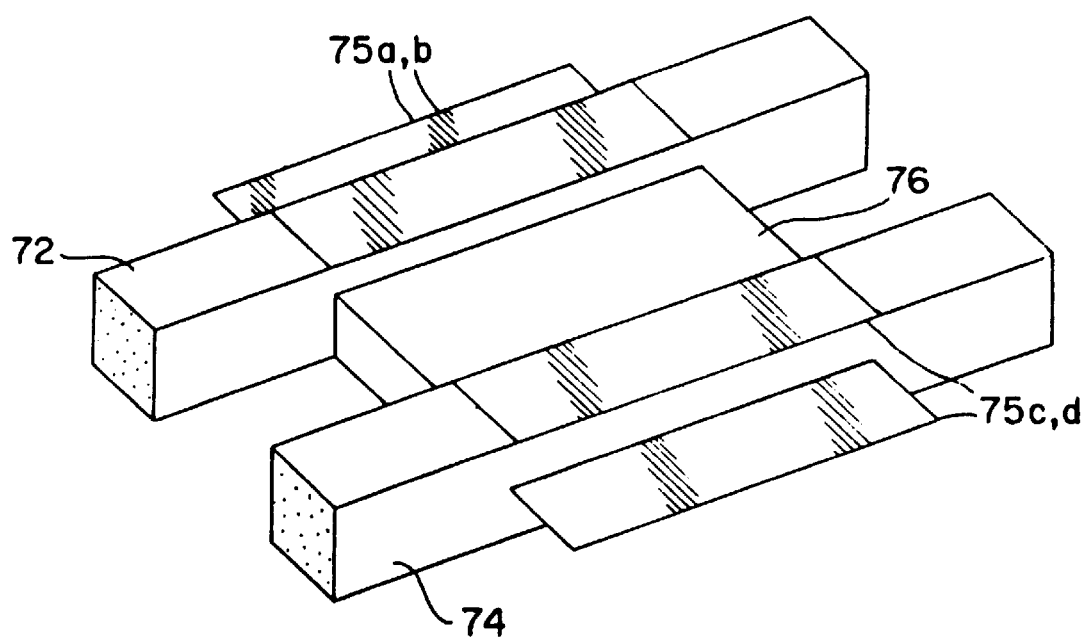
FIG. 16 is a perspective view of a rectilinear optical device of the invention bearing electrodes in contact with waveguide members.

Electro-optic devices according to the invention typically include one or more electrodes disposed on the surface of or inserted into selected portions of the device. The electrodes, which are coupled with an external voltage source such as a generator or battery, can be used to establish constant or variable electric fields within selected segments or regions of the device. The electric field is established in a direction perpendicular to the direction of light propagation within the waveguide. The electrodes can be arranged in a wide variety of configurations to suit particular applications. For example, as shown in FIGS. 1–8, 11, 12, and 16, electrodes (e.g., 15, 25, 35, 45, 65 and 75) can be located on one or more waveguide members, on one or more coupling members, or on both waveguide members and coupling members. As shown in FIG. 15, the electrode preferably is coupled to an external voltage source 67. Electrodes according to the invention can be constructed from any material that conducts electricity, including, for example, gold, silver, and aluminum.

Figure 17:
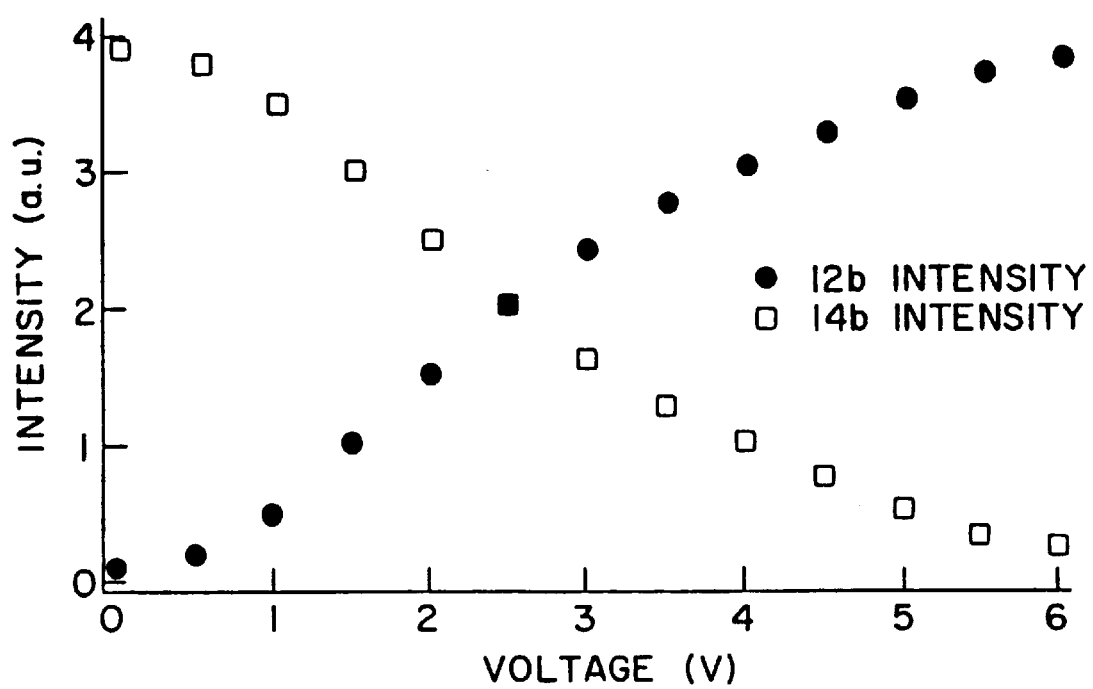
FIG. 17 is graph showing output intensity as a function of applied voltage in an optical device of the invention.

The devices of the invention exhibit a number of novel performance characteristics. For example, in the absence of an applied electric field to device 10 in FIG. 1, all input light from surface 12a is transferred to output surface 14b. The input plane, as an object plane, is imaged oppositely to the output plane. However, when an electrical field is applied to coupling member 16 by electrode 15, the refractive index changes, thereby changing the imaging condition. The calculated change in the light intensity distribution between output surfaces as a function of increased field voltage for a device of the single-mode type shown in FIG. 1 is shown in FIG. 17. As the refractive index of the coupling member is steadily reduced with increased applied voltage, the device gradually recovers to its original state. As shown by the results for the highest voltage in FIG. 17, the input light at surface 12a will then be effectively transferred directly to output surface 12b.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. An optical device comprising:
   a first member having a longitudinal surface extending between a first input surface and a first output surface and including a first coupling surface;
   a second member having a longitudinal surface extending between a second input surface and a second output surface and including a second coupling surface; and
   a coupling member disposed between said first member and said second member, said coupling member including a third coupling surface optically coupled with said first coupling surface and a fourth coupling surface optically coupled with said second coupling surface, wherein:

said first coupling surface is bonded to and optically coupled with said third coupling surface; or said second coupling surface is bonded to and optically coupled with said fourth coupling surface; or said first member and said coupling member form defined regions within a monolithic structural element; or said second member and said coupling member form defined regions within a monolithic structural element.

2. The optical device of claim 1 wherein a lateral cross-section of said first member is tetrahedral.

3. The optical device of claim 1 wherein a lateral cross-section of said second member is tetrahedral.

4. The optical device of claim 1 wherein a lateral cross-section of said coupling member is tetrahedral.

5. The optical device of claim 1 wherein a lateral cross-section of said first member is elliptical.

6. The optical device of claim 1 wherein a lateral cross-section of said second member is elliptical.

7. The optical device of claim 1 wherein a lateral cross-section of said coupling member is elliptical.

8. The optical device of claim 1 wherein a longitudinal cross-section of said first member is tetrahedral.

9. The optical device of claim 1 wherein a longitudinal cross-section of said second member is tetrahedral.

10. The optical device of claim 1 wherein a longitudinal cross-section of said coupling member is tetrahedral.

11. The optical device of claim 1 wherein said first member and said second member each have a length, width, and height, and said lengths are substantially the same, said widths are substantially the same, and said heights are substantially the same.

12. The optical device of claim 1 wherein said first member and said coupling member each have a length, width, and height, and the width of said coupling member is less than the width of said first member and the height of said coupling member is less than the height of said first member.

13. The optical device of claim 1 wherein said first member and said coupling member each have a length, width, and height, and the length of said coupling member is less than the length of said first member.

14. The optical device of claim 1 wherein at least one of said first member, said second member, and said coupling member comprises a compound having formula (1), (2), (3), or (4):

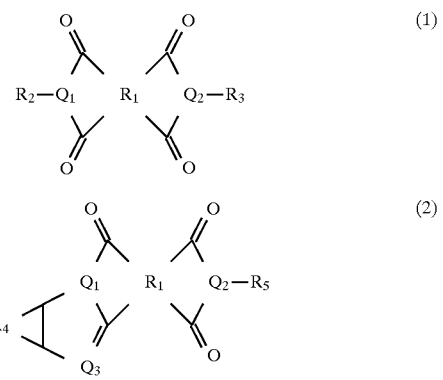

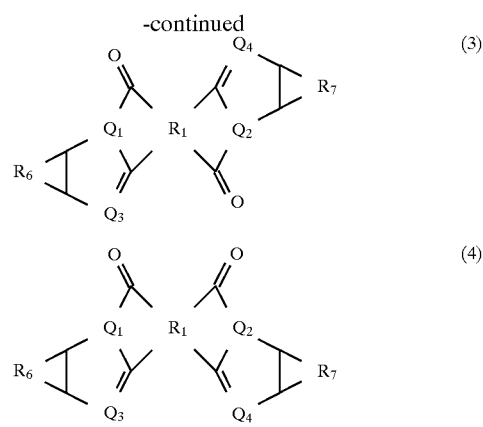

wherein:

$R_1$ is a tetravalent aromatic radical;

$Q_1$, $Q_2$, $Q_3$, and $Q_4$ are, independently, heteroatoms that participate in delocalized $\pi$-electron systems; and $R_2$–$R_7$ are, independently, alkyl groups or aromatic groups.

15. The optical device of claim 1 wherein said first coupling surface is bonded to and optically coupled with said third coupling surface.

16. The optical device of claim 1 wherein said second coupling surface is bonded to and optically coupled with said fourth coupling surface.

17. The optical device of claim 1 wherein said first member and said coupling member form defined regions within a monolithic structural element.

18. The optical device of claim 1 wherein said second member and said coupling member form defined regions within a monolithic structural element.

19. The optical device of claim 1 further comprising input means coupled with said first member for supplying light to said first input surface.

20. The optical device of claim 1 further comprising input means coupled with said second member for supplying light to said second input surface.

21. The optical device of claim 1 further comprising output means coupled with said first member for receiving light from said first output surface.

22. The optical device of claim 1 further comprising output means coupled with said second member for receiving light from said second output surface.

23. The optical device of claim 1 further comprising electrode means for establishing a modulating electric field within said device, said electrode means being disposed on a surface of said device.

24. The optical device of claim 23 wherein said electrode means is being disposed on a surface of said coupling member.

25. The optical device of claim 23 wherein said electrode means is disposed on a surface of said first member and on a surface of said second member.

26. The optical device of claim 23 wherein said electrode means is disposed on a surface of said first member, on a surface of said second member, and on a surface of said coupling member.

27. The optical device of claim 1 wherein said first member, said second member, and said coupling member each has a refractive index.

28. The optical device of claim 27 wherein the refractive indices of said first member and said coupling member are different.

29. The optical device of claim 27 wherein the refractive indices of said second member and said coupling member are different.

30. The optical device of claim 29 wherein the refractive indices of said first member and said second member are substantially the same.

31. The optical device of claim 27 wherein the refractive indices of said first member and said second member are different.

32. The optical device of claim 27 further comprising cladding disposed on a surface of said device.

33. The optical device of claim 32 wherein the refractive indices of said first member, said second member, and said coupling member are each greater than the refractive index of said cladding.

34. The optical device of claim 32 wherein the refractive index of said coupling member is greater than the refractive indices of said first member, said second member, and said cladding.

35. The optical device of claim 1 further comprising at least a first peripheral coupling assembly, said first peripheral coupling assembly comprising:
   a peripheral coupling member optically coupled with said first member or said second member; and
   a peripheral waveguide member optically coupled with said peripheral coupling member, said peripheral waveguide member having a longitudinal surface extending between an input surface and an output surface.

36. The optical device of claim 35 further comprising a plurality of additional peripheral coupling assemblies optically coupled with one another and with said first peripheral coupling assembly, said additional peripheral coupling assemblies individually comprising:
   a peripheral coupling member optically coupled with a peripheral waveguide member of a further peripheral coupling assembly; and
   a peripheral waveguide member optically coupled with a peripheral coupling member, said peripheral waveguide member having a longitudinal surface extending between an input surface and an output surface.

37. A process for preparing an optical device, comprising the steps of:
   providing a first member having a first longitudinal surface extending between a first input surface and a first output surface;
   optically coupling said first member with a coupling member; and
   optically coupling said coupling member with a second member having a second longitudinal surface extending between a second input surface and a second output surface, wherein:
      at least one surface of said first member is bonded to and optically coupled with a surface of said coupling member; or
      at lest one surface of said second member is bonded to and optically coupled with said coupling member; or
      said first member and said coupling member form defined regions within a monolithic structural element; or said second member and said coupling member form defined regions within a monolithic structural element.

38. The process of claim 37 further comprising coupling at least one of said input surfaces with input means for supplying light to said input surface.

39. The process of claim 37 further comprising coupling at least one of said output surfaces with output means for receiving light from said output surface.

40. The process of claim 37 further comprising disposing electrode means on a surface of said device.

41. A process for modulating light, comprising the steps of:
   (a) applying said light to an input surface of a device that comprises:
      a first member having a longitudinal surface extending between a first input surface and a first output surface;
      a second member having a longitudinal surface extending between a second input surface and a second output surface;
      a coupling member disposed between said first member and said second member, said coupling member being optically coupled with said first member and said second member such that: at least one surface of said first member is bonded to and optically coupled with a surface of said coupling member; or at lest one surface of said second member is bonded to and optically coupled with said coupling member; or said first member and said coupling member form defined regions within a monolithic structural element; or said second member and said coupling member form defined regions within a monolithic structural element;
      output means coupled with said first member for receiving light from said first output surface;
      output means coupled with said second member for receiving light from said second output surface; and
      electrode means disposed on a surface of said device;
   said application of light resulting in a discharge of light from at least one of said output surfaces, said discharge having measurable intensity, frequency, or wavelength;
   (b) applying a voltage to said electrode means for a time and under conditions effective to alter said intensity, frequency, or wavelength of said discharge.

42. The process of claim 41 wherein said light is applied to said first input surface and said discharge is from said second output surface.

43. The process of claim 42 wherein said application of voltage to said electrode means decreases said intensity of said discharge.

44. The process of claim 41 wherein said application of voltage to said electrode means results in a discharge of light from said first output surface.

* * * * *